(12) United States Patent
Lee

(10) Patent No.: US 8,558,834 B2
(45) Date of Patent: Oct. 15, 2013

(54) METHOD, MEDIUM AND APPARATUS FOR ENCODING AND DECODING 3D DATA USING ADAPTIVE OCTREES

(75) Inventor: Shinjun Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 11/059,462

(22) Filed: Feb. 16, 2005

(65) Prior Publication Data

US 2005/0180340 A1    Aug. 18, 2005

(30) Foreign Application Priority Data

Feb. 17, 2004 (KR) .................. 10-2004-0010401

(51) Int. Cl.
*G06T 17/00* (2006.01)

(52) U.S. Cl.
USPC .......................................... 345/424

(58) Field of Classification Search
None
See application file for complete search history.

(56) References Cited

U.S. PATENT DOCUMENTS 6,559,848 B2 *   5/2003   O'Rourke .................. 345/473
7,263,236 B2     8/2007   Park et al.

FOREIGN PATENT DOCUMENTS

| JP | 2000-182081 | 6/2000 |
|----|-------------|--------|
| JP | 2004-005373 | 1/2004 |

OTHER PUBLICATIONS

Zhirkov et al., ISO/IEC JTC 1/SC 29/WG 11, MPEG2002/M8519, Jul. 2002, Klagenfurt, Title: "Improvement of OctreeImage in Depth Image-Based Representation", Source: Samsung AIT, Moscow State University.*
Foley et al, "Computer Graphics: Principles and Practice", 2nd Ed. in C, Pub 1996 by Addison-Wesley, pp. 550-555 and 584-587.*
Bayakovski et al., "Depth Image-based Representations and Compression for Static and Animated 3D Objects", Image Processing. 2002, citeseer.ist.psu.edu/article/bayakovski02depth.html.*
DeBry, D., Gibbs, J., Petty, D. D., and Robins, N. 2002. Painting and rendering textures on unparameterized models. In Proceedings of the 29th Annual Conference on Computer Graphics and interactive Techniques (San Antonio, Texas, Jul. 23-26, 2002). SIGGRAPH '02. ACM, New York, NY, 763-768.*

(Continued)

*Primary Examiner* — Daniel Hajnik
(74) *Attorney, Agent, or Firm* — Staas & Halsey LLP

(57) ABSTRACT

A method, medium, and apparatus for encoding and decoding three-dimensional (3D) data. The method of encoding includes converting 3D data having at least of any one of PointTexture, voxel, and octree data into adaptive octree data where intermediate nodes are given labels, encoding nodes of the adaptive octree, and generating a bitstream from the encoded data. The method of decoding includes reading nodes making up a tree from a bitstream of the 3D data, decoding the read nodes, recovering an adaptive octree from the decoded nodes, and recovering at least any one of octree, voxel, and PointTexture data from the adaptive octree. It is possible to efficiently encode a huge amount of 3D data, and to recover the high-definition 3D data with a small amount of data since it is possible to efficiently encode the volume data with a certain resolution as well as a fixed resolution.

21 Claims, 12 Drawing Sheets

(56) References Cited

OTHER PUBLICATIONS

Wilhelms, J. and Van Gelder, A. 1992. Octrees for faster isosurface generation. ACM Trans. Graph. 11, 3 (Jul. 1992), 201-227. DOI= http://doi.acm.org/10.1145/130881.130882.*
Ralf Kahler, Mark Simon, Hans-Christian Hege, "Interactive Volume Rendering of Large Sparse Data Sets Using Adaptive Mesh Refinement Hierarchies," IEEE Transactions on Visualization and Computer Graphics, vol. 9, No. 3, pp. 341-351, Jul.-Sep. 2003.*
Andrew Hunter, Philip J. Willis, Breadth-first quad encoding for networked picture browsing, Computers & Graphics, vol. 13, Issue 4, 1989, pp. 419-432.*
In-Wook Song et al., "Progressive Compression of PointTexture Images", Proceedings of the SPIE—The International Society for Optical Engineering SPIE-Int. Soc. Opt. Eng USA, vol. 5308, No. 1, Jan. 20, 2004, pp. 1159-1168.
In Kyu Park et al., "Compression of PointTexture in Depth Image-based Representation (DIBR)" ISO/IEC JTC1/SC29/WG11, Jul. 20, 2003, pp. 1-11.
Y. Bayakovski et al., "Depth Image-Based Representations for Static and Animated 3D Objects", Proceedings 2002 International Conference on Image Processing. ICIP 2002. Rochester, NY, Sep. 22-25, 2002, International Conference on Image Processing, New York, NY: IEEE, US, vol. 2 of 3, Sep. 22, 2002, pp. 25-28.
Hanan Samet et al., "Octree approximation and compression methods", 3D Data Processing Visualization and Transmission, 2002. Proceedings. First International Symposium on Jun. 19-21, 2002, Piscataway, NJ, USA, IEEE, Jun. 19, 2002, pp. 460-469.
A. Li et al., "Octree Encoding of Objects From Range Images", Pattern Recogniztion, Elsevier, Kidlington, GB, vol. 27, No. 5, May 1, 1994, pp. 727-739.
European Search Report, mailed Jan. 24, 2007, and issued in corresponding European Patent Application No. 05250828.0-1522.
"High Efficiency Encoding Octree-Expressed 3D Object Shape," Hiroshi Toriyama et al., Technical Report of Television Society, Japan, Television Society, Co., Jan. 30, 1992, Book 16, Issue 10 p. 31-36.
"Development of Prototyping System Integrating Meta Ball and Voxel Data," Ryoji Matsuda et al., Video Electronic Society Journal, Japan, Video Electronic Society, Aug. 25, 1997, Book 26, Issue 4, p. 314-324.
Japanese Patent Notice of Reason for Rejection mailed Jul. 27, 2010 corresponds to Japanese patent application 2005-039422.
"MPEG-4 Animation Framework eXtension (AFX) WD 3.0", SNHC, 2003, Hawaii, pp. 1-22.
Marcelo J. Weinberger et al., "The LOCO-I Lossless Image Compression Algorithm: Principles and Standardization into JPEG-LS", Department of Electrical and Computer Engineering, University of Minnesota, pp. 1-33, 2003.
Chang-Su Kim et al., "Compact Encoding of 3-D Voxel Surfaces Based on Pattern Code Representation", Aug. 2002, pp. 932-943.
Jiangang Duan et al., "Compression of the Layered Depth Image", Department of Electronic Engineering, Tsinghua University, Beijing, 2001, pp. 331-340.
Paul G. Howard et al., "Arithmetic Coding for Data Compression", 1993, pp. 1-8.
Khalid Sayood, "Introduction to Data Compression: Second Edition", pp. 148-168.
"JPEG 2000 Part I Final Committee Draft Version 1.0", ISO/IEC JTCl/SC29 WGI, JPEG 2000, Mar. 16, 2000, pp. 1-189.
"MPEG-4 Video Verification Model version 13.04", Video Subgroup, Mar. 1998, pp. 1-435.

\* cited by examiner

```
PointTexture {
    field  SFInt32  width        256
    field  SFInt32  height       256
    field  MFInt32  depth        [ ]
    field  MFColor  color        [ ]
    field  SFInt32  depthNbBits  7
}
```
To be compressed

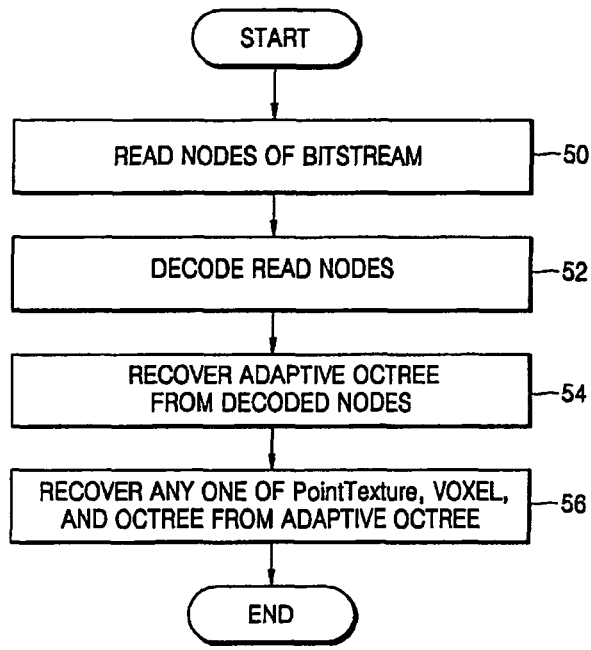
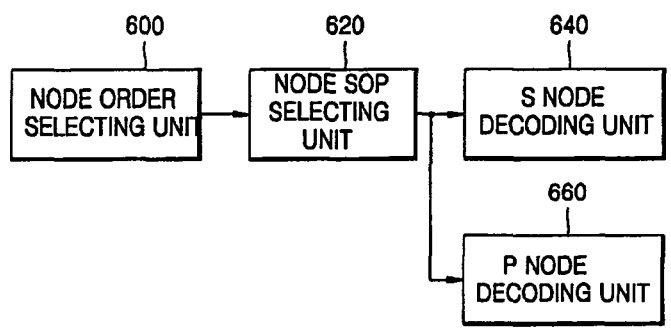

(a) depth=k-1    (b) depth=k

METHOD, MEDIUM AND APPARATUS FOR ENCODING AND DECODING 3D DATA USING ADAPTIVE OCTREES

CROSS-REFERENCE TO RELATED APPLICATIONS

This application claims the benefit of Korean Patent Application No. 10-2004-0010401, filed on Feb. 17, 2004, in the Korean Intellectual Property Office, the disclosure of which is incorporated herein in its entirety by reference.

BACKGROUND OF THE INVENTION

1. Field of the Invention

Embodiments of the present invention relate to encoding and decoding three-dimensional (3-D) data, and more particularly, to a method, medium, and apparatus for encoding and decoding 3-D data having any one of PointTexture, voxel, and octree data.

2. Description of the Related Art

3-D graphics typically require a huge amount of data. PointTexture data can be converted into voxel data and octree data, which also requires a huge amount of data. Such a huge amount of data requires high-capacity memory and high-speed data processing capabilities. Accordingly, efficient data compression becomes necessary, and the data processing becomes expensive.

Techniques for creating realistic graphic images are currently under study in the 3-D graphics field. One of these is an image-based rendering method. This method has the advantage of making it possible to reduce the required amount of data and processing time compared with a polygonal mesh model used in conventional 3-D data modeling methods. In addition, the image-based rendering method can provide more realistic images.

3-D objects are currently represented mainly using polygonal mesh models. Certain 3D forms can be represented by using triangles, rectangles, or other polygons. Recent developments in 3D graphics software and hardware techniques have brought real-time visualization of complicated objects and scenes by use of polygonal models in still or moving images.

Meanwhile, active research on other 3D representation methods have been in progress, with the goal of overcoming the difficulties of representing actual objects with polygonal models, the required long processing times due to the high complexity in renderings, and the difficulty of generating realistic images like photographs.

Certain applications require a huge number of polygons. For instance, detailed models for a human body typically need millions of polygons, and it is thus difficult to handle these polygons. While recent advances in 3D measurement systems, like 3D scanners, allow high-density 3D data to be obtained with permissible error, acquiring consecutive and perfect polygonal models is still difficult and expensive. In addition, rendering techniques for attaining high resolutions equal to that of a photograph require complicated processes, which makes real-time rendering difficult.

Depth image-based representation (DIBR) is a new method for representing and rendering 3D objects with complex geometries and has been adopted into MPEG-4 Animation Framework eXtension (AFX). Instead of representing objects with polygonal meshes, as done typically in computer graphics, DIBR represents a 3D object with a set of reference images covering its visible surface. Each reference image is represented by a corresponding depth map, which is an array of distances between the pixels in the image plane to the object surface. One of the advantages of DIBR is that reference images can provide high quality visualization of the object without using complex polygonal models. In addition, the complexity of rendering a DIBR view is only related to the number of pixels in the view (i.e., the resolution of the view) regardless of the scene complexity. The DIBR has three major formats: SimpleTexture, PointTexture, and OctreeImage. PointTexture represents an object with an array of pixels viewed from a single camera location. Each PointTexture pixel is represented by its color, depth (the distance from the pixel to the camera), and a few other properties supplementing PointTexture rendering. There can be multiple pixels along each line of sight, and thus a PointTexture usually includes of multiple layers. FIG. 1 shows a simple example of one-dimensional PointTexture. PointTexture typically requires a massive amount of data. Realistic images require higher sampling density and a tremendous amount of data. Therefore, the compression of PointTexture images should be performed efficiently. FIG. 2 shows a PointTexture node specification. Depth and color fields should be compressed in the node specification of FIG. 2.

There has been limited research on PointTexture. Duan and Li proposed an algorithm for compressing PointTexture images, i.e., an algorithm for compressing layered depth images (LDIs), J. Duan and J. Li, "Compression of the Layered Depth Image", IEEE Trans. Image Processing, vol. 12, no. 3, pp. 365-372, March 2003. This algorithm uses the JPEG-LS algorithm to compress depth data. Also, color data is compressed by using existing coding standards. However, this algorithm does not support progressive compression and transmission.

An algorithm for compressing 3D voxel surface models based on pattern code representation (PCR) was proposed by C. S. Kim and S. U. Lee in "Compact Encoding of 3D Voxel Surface Based on Pattern Code Representation", IEEE Trans. Image Processing, vol. 11, no. 8, pp. 932-943, 2002. However, this algorithm does not utilize a hierarchical octree structure, and also does not support progressive compression.

In MPEG-4 AFX, an algorithm for compressing an octree based on the prediction by partial matching (PPM) scheme was proposed in ISO/IEC JTC1/SC29NVG11 14496-16: 2003, Information Technology—Coding of Audio-Visual Objects—Part 16: Animation Framework eXtension (AFX). However, this algorithm does not create progressive bitstreams. Also, this algorithm uses an octree-compression algorithm, which can compress only volume data with a fixed resolution, i.e., an equal number of pixels in width, height, and depth. In other words, this algorithm cannot compress data with a certain resolution, i.e., a different number of pixels in width, height, and depth.

SUMMARY OF THE INVENTION

Embodiments of the present invention provide a method, medium, and apparatus for efficiently encoding 3D data using progressive compression.

Embodiments of the present invention also provide a method, medium, and apparatus for efficiently decoding 3D data using progressive decompression by an adaptive octree.

Additional aspects and/or advantages of the invention will be set forth in part in the description which follows and, in part, will be obvious from the description, or may be learned by practice of the invention.

According to an aspect of the present invention, there is provided a method of encoding 3D data, including converting 3D data having any one of at least PointTexture, voxel, and octree data into adaptive octree data where intermediate nodes are given labels, encoding nodes of the adaptive octree, and generating a bitstream from the encoded data. The converting of the 3D data may include converting 3D data having the PointTexture or voxel data into an octree, and converting the octree into an adaptive octree where intermediate nodes are given labels.

The converting of the 3D data into adaptive octree data in the converting of the 3D data may include converting the 3D data into voxel data using a 3D bounding volume, and differentiating a voxel with respect to a location where a 3D object exists and a voxel with respect to a location where a 3D object does not exist by predetermined labels. The labels may be used for indicating a case 'S' where a node of a tree indicating the 3D data has sub-nodes, a case 'W' where a node has voxels not having objects, a case 'B' where a node has voxels having objects, a case 'P' where voxel values within a node are encoded by the PPM algorithm, and a case 'E' where a space for voxels of a node does not exist.

The encoding of nodes of the adaptive octree may include selecting the order of nodes of the adaptive octree to be encoded, selecting node type information indicating whether the nodes to be encoded should be encoded into 'S' or 'P', and encoding the detailed information of an 'S' node if the node type information is 'S', and encoding the detailed information of a 'P' node if the node type information is 'P'. The selecting of the order of nodes may include selecting the nodes to be encoded one by one in a breadth-first search scheme and a top-down manner starting from a root node by referring to the labels in the adaptive tree structure for a 3D object. The selecting of the node type information may include calculating the entropy for each of the 'S' node and 'P' node encoding operations and selecting the encoding operation with smaller entropy, and performing an AAC (adaptive arithmetic coder)- encoding operation of the label of the selected 'S' or 'P' node. The encoding of the 'S' node in the encoding of the detailed information of the 'P' or 'S' node may include encoding the average value of the color information and the labels of the sub-nodes, wherein the encoding of the color information performs an AAC-encoding operation of the average color of voxels within the current node area into R (red), G (green), and B (blue) values, and the encoding of the labels of the sub-nodes performs an AAC-encoding operation of the labels of the sub-nodes of the current node into 'B' or 'W' value. The encoding of the 'P' node in the encoding of the detailed information of the 'P' or 'S' node may include encoding the depth information and the color information, wherein the encoding of the depth information performs a PPM- or an AAC-encoding operation of all sub-nodes of the current node in raster scan order using a predetermined number of contexts, and the encoding of the color information performs DPCM (differential pulse code modulation)- and AAC-encoding operations of the R, G, and B values of 'B' voxels within the current node area.

The generating of the bitstream from the encoded data may include generating a progressive bitstream, which includes resolution information of the bounding volume of a 3D object and supports both a lossy encoding scheme encoding only a part of nodes from the beginning until a predetermined node and a lossless encoding scheme encoding all nodes from the beginning to the end.

According to another aspect of the present invention, there is provided an apparatus for encoding 3D data, including an adaptive octree generating unit converting 3D data having any one of at least PointTexture, voxel, and octree data into adaptive octree data where intermediate nodes are given labels, a node encoding unit encoding nodes of the adaptive octree, and a bitstream generating unit generating a bitstream from the data encoded in the node encoding unit. The adaptive octree generating unit may include a volume data inputting unit converting 3D data having PointTexture or voxel data into an octree, and an adaptive octree converting unit converting the octree into an adaptive octree where intermediate nodes are given labels.

The node encoding unit may include a node order selecting unit selecting the order of nodes of the adaptive octree to be encoded, a node SOP selecting unit selecting node type information indicating whether the nodes to be encoded should be encoded into an 'S' node or a 'P' node, an 'S' node encoding unit encoding the detailed information of an 'S' node if the node type information is 'S', and a 'P' node encoding unit encoding the detailed information of a 'P' node if the node type information is 'P'. The node order selecting unit may select nodes to be encoded one by one in a breadth-first search scheme and a top-down manner starting from a root node by referring to the labels in the adaptive tree structure for a 3D object. The node SOP selecting unit may calculate entropy for each of the 'S' node and 'P' node encoding operations and select the encoding operation with small entropy, and perform an AAC-encoding operation of the label of the selected 'S' or 'P' node. The 'S' node encoding unit may encode the average value of the color information and the labels of the sub-nodes, and the 'P' node encoding unit may encode the depth information and the color information. The bitstream generating unit may generate a progressive bitstream which includes the resolution information of the bounding volume of a 3D object and supports both a lossy encoding scheme encoding only a part of nodes from the beginning until a predetermined node and a lossless encoding scheme encoding all nodes.

According to another aspect of the present invention, there is provided a method of decoding 3D data, including reading nodes making up a tree from a bitstream of 3D data, decoding the read nodes, recovering an adaptive octree from the decoded nodes, and recovering any one of at least octree, voxel, and PointTexture data from the adaptive octree. The reading of nodes may further include reading resolution information of a bounding volume of a 3D object, and the decoding of read nodes may include decoding only a part of nodes from the beginning until a predetermined node by using the resolution information.

The operation reading of nodes may further include reading resolution information of a bounding volume of a 3D object, and the decoding of the read nodes may include decoding all nodes from the beginning to the end by using the resolution information. The decoding of the read nodes may include selecting the order of nodes to be decoded, selecting node type information indicating whether the node to be decoded is an 'S' or a 'P' node, and decoding the detailed information of an 'S' node if the node type information is 'S', and decoding the detailed information of a 'P' node if the node type information is 'P'.

The selecting of the order of nodes may include selecting nodes to be decoded one by one in a breadth-first search scheme starting from a root node while recovering the adaptive tree structure for a 3D object in a top-down manner. The selecting of node type information may include determining whether an 'S' or a 'P' label is inversely AAC-decoded into an 'S' or a 'P' node. The decoding of an 'S' node in the decoding of the detailed information of the 'S' or 'P' node may include decoding the average value of color information, and decoding labels of sub-nodes. In the decoding of the color information, the average R, G, and B values of the voxels in the current node may be decoded using an inverse AAC, and, in the decoding of the labels of sub-nodes, the labels of sub-nodes may be decoded into the 'B' or 'W' value by way of the inverse AAC. The decoding of a 'P' node in the decoding of the detailed information of the 'S' or 'P' node may include decoding the depth information, and decoding the color information. The decoding of the depth information may include performing an inverse PPM- or an inverse AAC-decoding operation of all sub-nodes of the current node in raster scan order using a predetermined number of contexts, and the decoding of the color information may include performing inverse AAC- and inverse DPCM-decoding operations of the R, G, and B values of 'B' voxels within the current node area.

In the recovering of the adaptive octree, a voxel on a location where a 3D object exists and a voxel on a location where a 3D object does not exist may be differentiated by predetermined labels.

According to another aspect of the present invention, there is provided an apparatus for decoding 3D data, including a bitstream reading unit reading nodes making up a tree from bitstreams of 3D data, a node decoding unit decoding the read nodes, an adaptive octree recovering unit recovering an adaptive octree from the nodes decoded in the node decoding unit, and a volume data recovering unit recovering any one of octree, voxel, and PointTexture data from the input adaptive octree.

The bitstream reading unit may read the resolution information of a bounding volume of a 3D object and nodes, and the node decoding unit may decode only a part of nodes from the beginning until a predetermined node or decodes all nodes from the beginning to the end.

The node decoding unit may include a node order selecting unit selecting the order of nodes to be decoded, a node SOP selecting unit selecting node type information indicating whether the nodes to be decoded should be decoded into an 'S' node or a 'P' node, an 'S' node decoding unit decoding the detailed information of an 'S' node if the node type information is 'S', and a 'P' node decoding unit decoding the detailed information of a 'P' node if the node type information is 'P'.

The node order selecting unit may select nodes to be decoded one by one in a breadth-first search scheme starting from a root node while recovering the adaptive tree structure for a 3D object in a top-down manner, and the node SOP selecting unit may perform an inverse AAC-decoding operation of an 'S' or a 'P' label into an 'S' or a 'P' node. The 'S' node decoding unit may decode the average value of color information and labels of sub-nodes, and the 'P' node decoding unit may decode depth information and color information.

The decoding of the depth information may include performing an inverse PPM- or an inverse AAC-decoding operation of all sub-nodes of the current node in raster scan order using a predetermined number of contexts, and the decoding of the color information may include performing inverse AAC- and inverse DPCM-decoding operations of the R, G, and B values of 'B' voxels within the current node area.

According to another aspect of the present invention, embodiments of the present invention can be implemented through computer readable code on a medium.

BRIEF DESCRIPTION OF THE DRAWINGS

The above and other features and advantages of the present invention will become more apparent by describing in detail exemplary embodiments thereof with reference to the attached drawings in which:

FIG. 5B is a flowchart showing a method of decoding 3D object data, according to an embodiment of the present invention;

FIG. 6 is a block diagram showing a node decoding unit;

DETAILED DESCRIPTION OF THE PREFERRED EMBODIMENTS

Figures 1, 2:
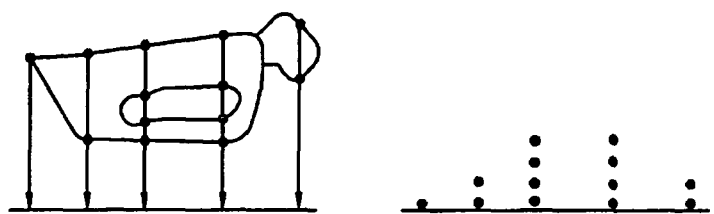
FIG. 1 shows an example of PointTexture for layered depth images.
FIG. 2 shows a PointTexture node specification.

Reference will now be made in detail to embodiments of the present invention, examples of which are illustrated in the accompanying drawings, wherein like reference numerals refer to the like elements throughout. The embodiments are described below to explain the present invention by referring to the figures.

Methods, media, and apparatuses for encoding/decoding three-dimensional (3D) volume data having any one of at least PointTexture, voxel, and octree data structures according to embodiments of the present invention will now be described in detail with reference to the accompanying drawings.

Figure 3A:
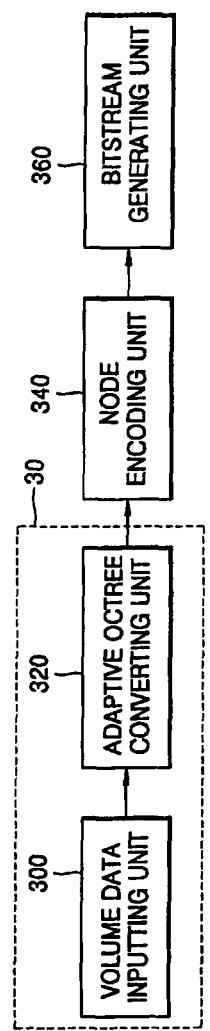
FIG. 3A is a block diagram showing an apparatus for encoding 3D object data, according to an embodiment of the present invention.
Figure 3B:
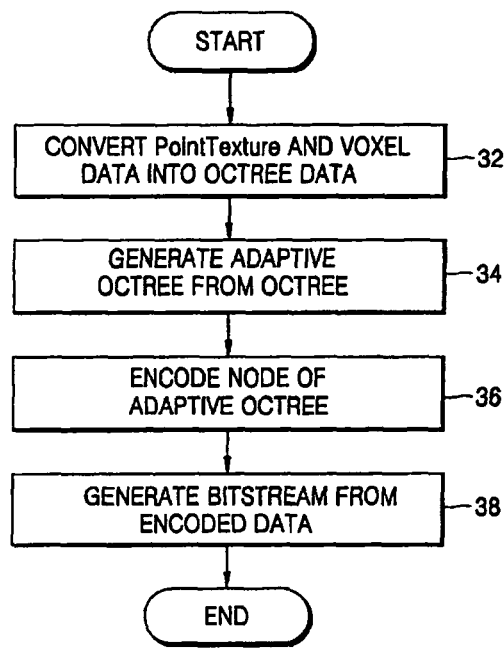
FIG. 3B is a flowchart showing a method of encoding 3D object data, according to an embodiment of the present invention.

A method, medium, and apparatus for encoding 3D object data, according to an embodiment of the present invention will now be set forth. FIG. 3A is a block diagram showing a construction of an apparatus for encoding 3D object data, according to an embodiment of the present invention. The apparatus includes a volume data inputting unit 300, an adaptive octree converting unit 320, a node encoding unit 340, and a bitstream generating unit 360. FIG. 3B is a flowchart showing a method of encoding 3D object data, according to an embodiment of the present invention.

The volume data inputting unit 300 may receive any of PointTexture, voxel, and octree data as an input. The PointTexture data can be converted into the voxel or octree data. The PointTexture data is converted into the voxel data, which is in turn converted into the octree data, the voxel data is converted into the octree data (operation 32), and the octree data is used as it is without any conversion.

In order to convert the depth information of the PointTexture into voxel data, a bounding volume is first created. The bounding volume has the same resolution as the PointTexture. For instance, if the PointTexture is an X×Y resolution image and the depth resolution of each pixel is Z, an X×Y×Z bounding volume is created, with the origin of the bounding volume being located at the lower left front corner. A right voxel has larger x value than a left voxel, an upper voxel has larger y value than a lower voxel, and a rear voxel has larger z value than a front voxel. It is straightforward to convert the depth information into the binary volume data. All voxels in the volume data are initialized with white (0) values. Then, a voxel is set to black (1) value if the location of the voxel is filled by a voxel in the PointTexture.

Figure 7:
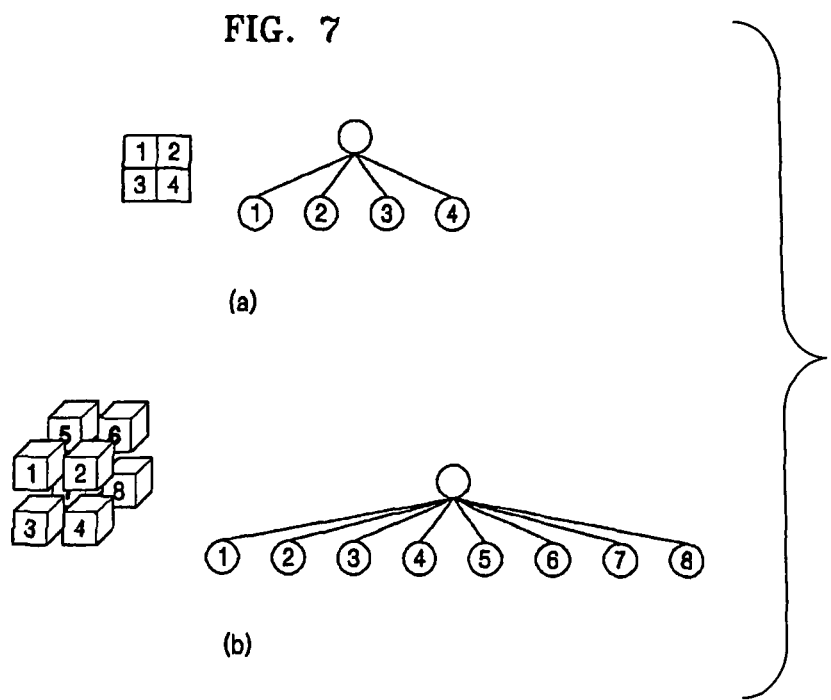
FIG. 7 shows a parent-child relationship in a tree.

FIG. 7 shows the parent-child relationship in a tree structure. Illustration (a) in FIG. 7 is an example of a quadtree, and illustration (b) in FIG. 7 is an example of an octree. The octree has a structure in which a root node has eight child nodes, and each of the child nodes may have eight child nodes or leaf nodes. A node can have a white or black value, where a leaf node with black value indicates an occupied voxel, and a leaf node with white value indicates an empty voxel. An intermediate node with black value other than the leaf node indicates that there are nodes with occupied voxels among its sub-nodes, and an intermediate node with white value indicates that the sub-nodes are all empty. This octree is a typical structure used for representing the 3D data.

The adaptive octree converting unit 320 generates an adaptive octree from the octree data in the volume data inputting unit 300 (operation 34). The adaptive octree has a structure in which a root node has eight child nodes, where each of the child nodes may have eight child nodes or leaf nodes. These nodes are accompanied with five kinds of labels. In embodiments of the present invention, the term "adaptive octree" is defined as a tree with such characteristics.

The adaptive octree is similar in structure to an octree except that an intermediate node is accompanied with labels. The five labels are 'S' (split), 'P' (PPM), 'B' (black), 'W' (white), and 'E' (empty) nodes. Table 1 indicates five labels for the octree nodes.

TABLE 1

| Labels | Comments |
|---|---|
| S | Split: The node is subdivided into 8 nodes |
| P | PPM: The voxel values within the node are encoded by the PPM algorithm |
| B | Fill black: The node has, or is approximated by, all black voxels |
| W | White: The node has all white voxels |
| E | Empty: The space for voxels of the node does not exist |

The adaptive octree is created as follows. First, if the bounding volume for a 3D object contains an object, the root node is labeled with 'S' and the volume is subdivided into eight equal size volumes. If a subdivided volume contains only white voxels or only black voxels, the corresponding node is labeled with 'W' or 'B', respectively. Otherwise, the node is set to 'S' and the volume is further subdivided into eight smaller volumes. This procedure is repeated until the tree is grown to a pre-specified depth. At this depth, if a node contains both black and white voxels, it is labeled with 'P' and its voxel values are encoded by the prediction by partial matching (PPM) scheme.

Meanwhile, in the case of subdividing the bounding volume into eight equal size volumes, if an axis cannot be half-divided into equal size lengths, the divided part is regularly divided one voxel length larger than the opposite part. If the opposite part does not have the voxel space, it is defined as an empty voxel, which is labeled with 'E'. If certain nodes include only 'B' and 'W' nodes while including an 'E' node, the node can be handled as 'P' node and the voxel values can be encoded by the PPM scheme.

Figure 8:
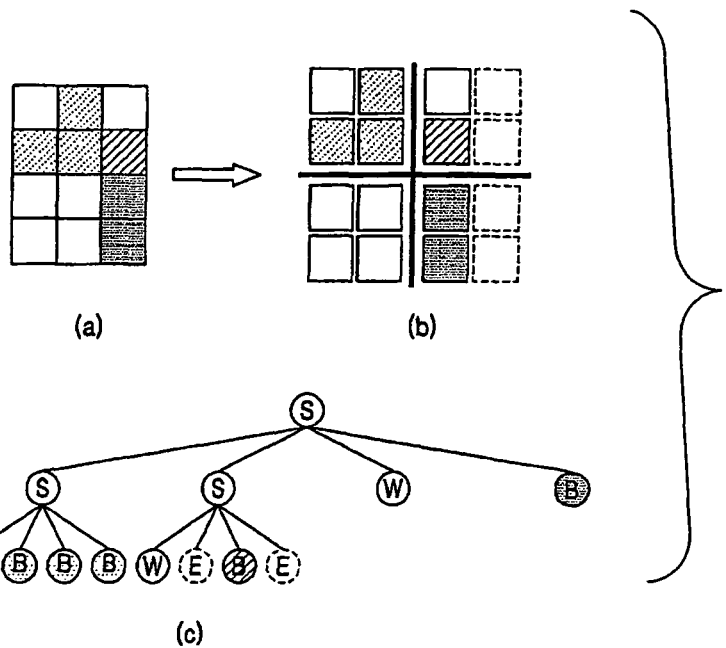
FIG. 8 shows an example of an adaptive tree with the resolution of 3×4.
Figure 9:
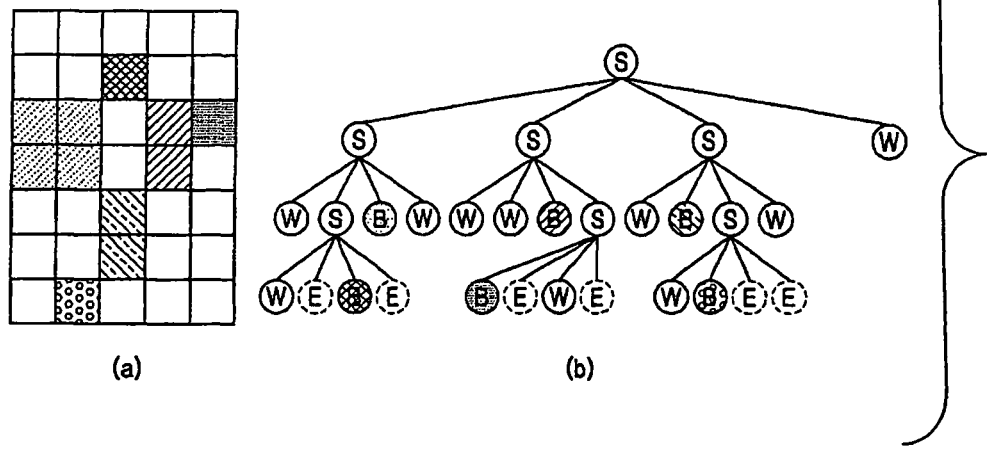
FIG. 9 shows an example of an adaptive tree with the resolution of 5×7.

For convenience, an example of a quadtree will be now described in detail. FIGS. 8 and 9 show adaptive quadtrees for more efficient explanation of the concept of the adaptive octree. Illustration (a) in FIG. 8 shows a quadtree for a two-dimensional image with the resolution of 3×4, which has a width of 3 and a height of 4. Colorless or white voxels indicate empty ones, and colored voxels indicate occupied ones. The colored nodes in illustration (c) in FIG. 8 correspond to the voxels with the same color in illustration (a) of FIG. 8.

When the root node is subdivided into four sub-nodes, a width of 3 is subdivided into 2 on one side and 1 on the other side, and a height of 4 is subdivided into 2 on either side. The root node labeled with 'S' in the adaptive quadtree of illustration (c) of FIG. 8 indicates that the child nodes contain objects. The four child nodes of the root node are labeled with 'S', 'S', 'W', and 'B'. The first and second 'S' nodes represent the voxel information by way of the child nodes. The child nodes of the first 'S' node are 'W', 'B', 'B', and 'B' nodes which correspond to four voxel areas on the left-top side of illustration (b) of FIG. 8. The child nodes of the second 'S' node are 'W', 'E', 'B', and 'E' nodes which correspond to four voxel areas on the right-top side of illustration (b) of FIG. 8. The 'B' node indicates that voxels are occupied, and the 'W' node indicates that voxels are empty. Information to be encoded is a node labeled with 'B' or 'W'. The 'E' node indicates that there is no space for voxels and it is thus not encoded. Accordingly, the 'E' node is a virtual one, which is located by using the resolution information of the entire bounding volume. The 'E' nodes are two voxels depicted in dotted line among four voxels on the right-top side of illustration (b) of FIG. 8, which do not exist in illustration (a) of FIG. 8. These virtual 'E' nodes are depicted for creating a virtual quadtree as if the first 'S' node had four child nodes.

Similarly, when eight child nodes of an 'S' node are represented in the adaptive octree, a child node with space for voxels is labeled with 'B' or 'W', and a child node without space for voxels is labeled with 'E'. When the space is subdivided into eight child nodes, one side of the space is regularly divided one voxel length larger than the opposite side, similarly to the adaptive quadtree. In other words, when the 3D volume space is represented by using three axes of X, Y, and Z, −X, −Y, and −Z directions are assigned one voxel length more than +X, +Y, and +Z directions. While the opposite case is also possible, discussed embodiments of the present invention apply the former rule to all nodes.

The 'W' node, the third child node of the root node in illustration (c) of FIG. 8, corresponds to an area for four voxels on the left-bottom side of illustration (b) of FIG. 8, which indicates that voxels are all empty. The 'B' node, the fourth child node of the root node in illustration (c) of FIG. 8, corresponds to an area for four voxels on the right-bottom side of illustration (b) of FIG. 8, which indicates that voxels are all occupied except virtual 'E' nodes. FIG. 9 shows an example of the adaptive tree, where illustration (a) of FIG. 9 shows a two-dimensional image with the resolution of 5×7, and illustration (b) of FIG. 9 shows an adaptive quadtree corresponding to illustration (a) of FIG. 9.

Meanwhile, the volume data inputting unit 300 and the adaptive octree converting unit 320 can be integrated. In other words, the two units may be incorporated into an adaptive octree generating unit 30 which straightforwardly converts 3D data made up of any one of PointTexture, voxel, and octree data into adaptive octree data.

Figure 4:
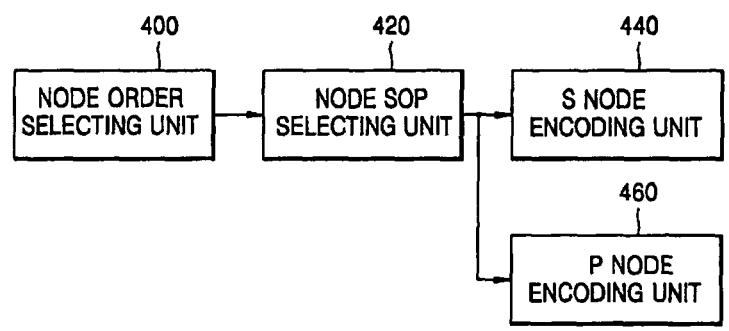
FIG. 4 is a block diagram showing a node encoding unit.

The node encoding unit 340 encodes the adaptive octree node generated by the adaptive octree converting unit 320 (operation 36). As shown in FIG. 4, the node encoding unit 340 may include a node order selecting unit 400, a node SOP selecting unit 420, an 'S' node encoding unit 440, and a 'P' node encoding unit 460.

Figure 10:
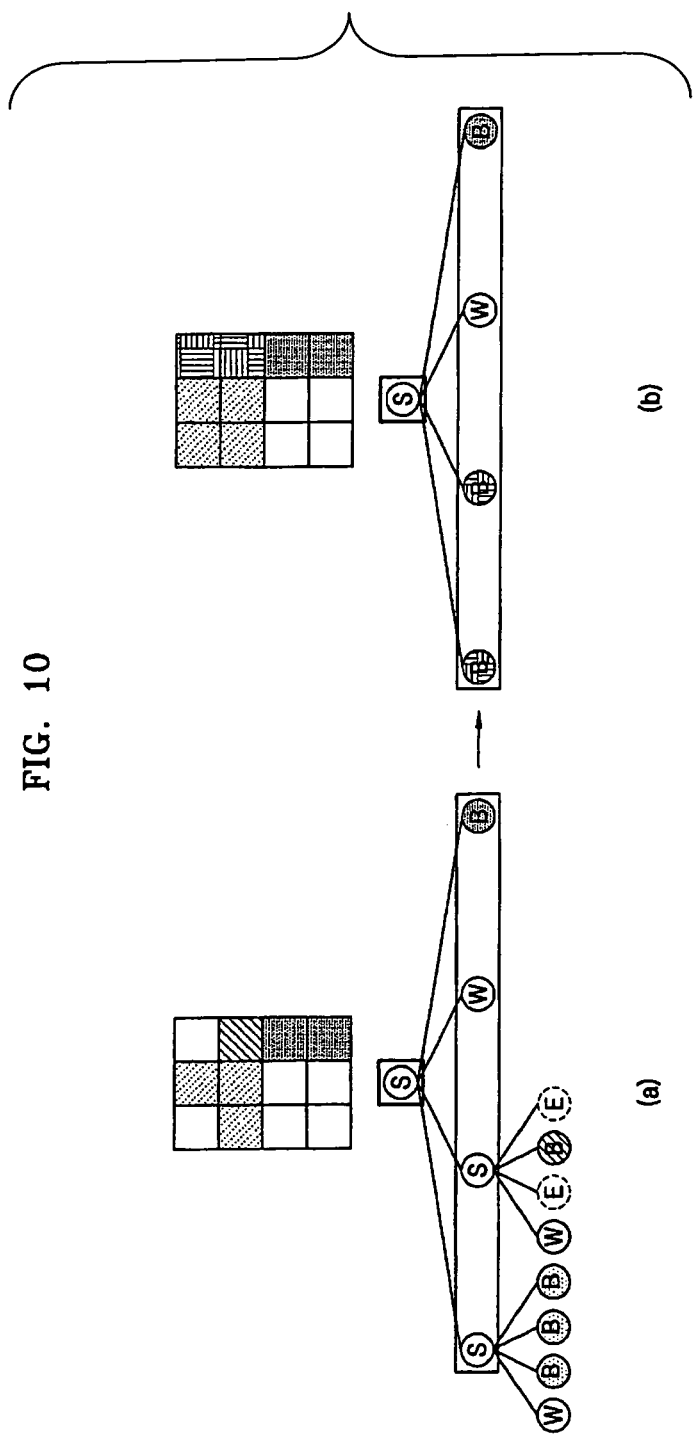
FIG. 10 shows examples explaining node encoding and decoding operations.

When sequentially selecting each node in the adaptive octree, the node order selecting unit 400 determines which node should be encoded to output a location information value of the node. More specifically, the node order selecting unit 400 selects nodes to be encoded one by one in a top-down manner starting from a root node by referring to the labels in the adaptive tree structure for a 3D object, and outputs location information values of the nodes. The order of nodes to be encoded is determined in a breadth-first search (BFS) scheme using a queue. After being inserted into the queue, the root node is removed from the queue while labels of child nodes of the root node are encoded. In illustration (a) of FIG. 10, the root node to be encoded is indicated by a square which is 'S', where the actual values of the node to be encoded are child nodes of the root node depicted by a rectangle, which are 'S', 'S', 'W', and 'B'.

The node SOP selecting unit 420 selects which node selected in the node order selecting unit 400 should be encoded into an 'S' node or a 'P' node. That is, the node SOP selecting unit 420 determines which node to be encoded should be encoded into an 'S' node or a 'P' node. After calculating the entropy for each of the 'S' node and 'P' node encoding operations, the encoding operation with the smallest entropy is selected. The label of the selected 'S' or 'P' node is AAC (adaptive arithmetic coder)-encoded.

Figure 11:
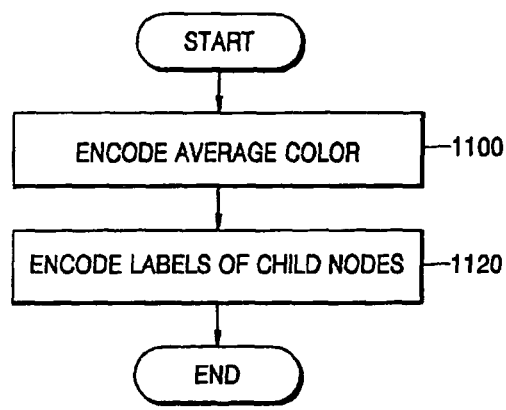
FIG. 11 is a flowchart showing a procedure of encoding an 'S' node.

The 'S' node encoding unit 440 performs a split-encoding operation. The 'S' node encoding unit 440 encodes an 'S' node according to the procedure shown in FIG. 11. The average color of the 'S' node to be encoded is first encoded by the AAC (operation 1100), and then the labels of the child nodes are encoded (operation 1120). When the root node is encoded into the 'S' node in illustration (a) of FIG. 10, the labels of the child nodes of the root node are 'S', 'S', 'W', and 'B', which are the actual values to be encoded. Among the labels of the child nodes, the 'B' node is substituted for the 'S' node and then encoded. Accordingly, the labels of the child nodes are encoded into 'B', 'B', 'W', and 'B' like the nodes within a rectangle in illustration (b) of FIG. 10. These values are the same as values recovered in a decoder.

Figure 12:
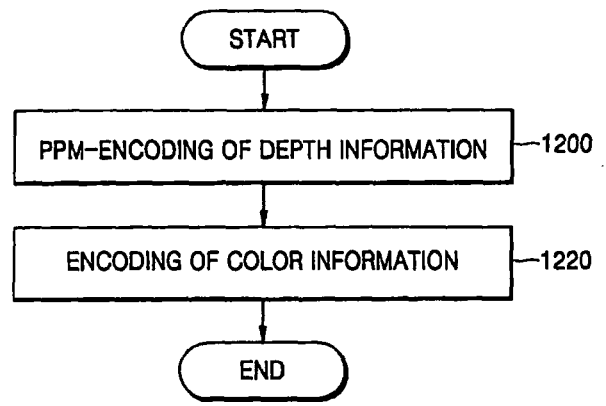
FIG. 12 is a flowchart showing a procedure of encoding an 'P' node.
Figure 13:
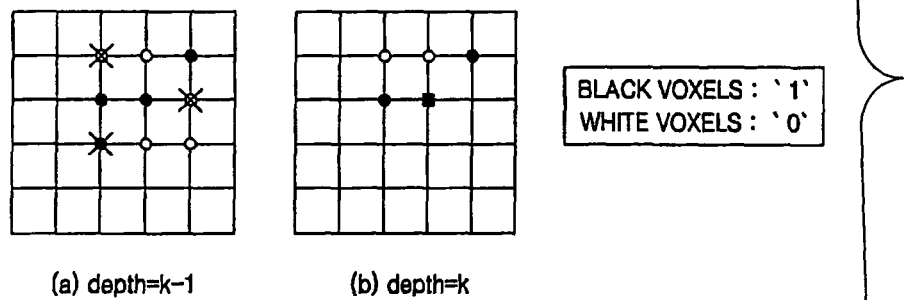
FIG. 13 shows a use of contexts in PPM encoding and decoding procedures.

The 'P' node encoding unit 460 performs a PPM encoding operation. The 'P' node encoding unit 460 encodes a 'P' node according to the procedure shown in FIG. 12. The depth information in the volume area of the node, the voxel values, is PPM-encoded (operation 1200), and the color information of each voxel location is DPCM (differential pulse code modulation)-encoded and AAC-encoded (operation 1220). FIG. 13 shows contexts used for PPM-encoding voxels. A two-dimensional plane with a depth of 'k' on the right side is a section where there are voxels previously encoded and to be currently encoded, and a two-dimensional plane with a depth of 'k−1' on the left side is a neighboring section where there are voxels previously encoded. In order to efficiently encode, only 10 circular voxels except voxels marked by 'X' are used to make a context and are PPM-encoded. Accordingly, in this case, the context is reduced from '0011101000011' to '0111000011'. The order of the context is enumerated according to the raster scan order. The PPM was originally proposed to compress facsimile data in a lossless manner.

Meanwhile, the bitstream generating unit 360 shown in FIG. 3 generates a bitstream from the nodes encoded in the node encoding unit 340 (operation 38). A split-encoded bitstream is generated in the case of an 'S' node in the tree, and a PPM-encoded bitstream is generated in the case of a 'P' node.

Figure 14:
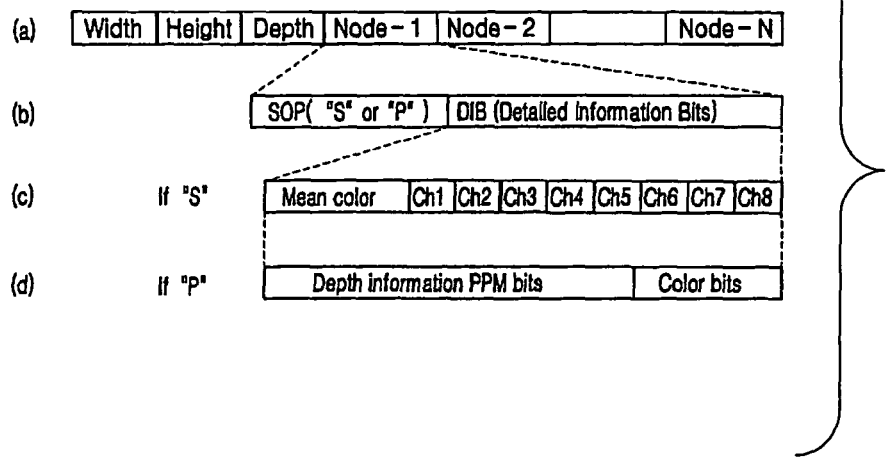
FIG. 14 shows a bitstream structure for a node.

Referring to illustration (a) of FIG. 14, the header information is encoded into width, height, and depth, which are the resolution information of volume containing a 3D object, to generate a bitstream. Next, nodes are sequentially encoded one by one starting from a root node to generate bitstreams. The nodes with the total number of 'N' to be encoded can be represented by Node-1, Node-2, . . . , Node-N. The bitstream of each of the nodes is composed of SOP ('S' or 'P') and DIB (detailed information bits) as shown in illustration (b) of FIG. 14.

If SOP indicates that the current node is an 'S' node, as shown in illustration (c) of FIG. 14, DIB includes the average color of the current node area and up to eight flags indicating whether the child nodes are 'W.' The eight flags can be represented by Ch1, Ch2, . . . , Ch8, which indicates that there are eight voxel areas. In the case of a node without voxel areas, the number of flags can be reduced. The values of the flags to be encoded can be AAC-encoded.

If SOP indicates that the current node is a 'P' node, as shown in illustration (d) of FIG. 14, the depth information of the voxels within the current node area is PPM-encoded, and the color information of the 'B' voxels is sequentially DPCM-encoded and AAC-encoded. The PPM encoding operation is now set forth. The depth information is represented by binary voxel values. 'W' voxels represent a transparent background, while 'B' voxels represent 3D objects. The binary voxel values within a 'P' node are PPM-encoded using the neighboring voxel values as contexts. An amount of data is too large to operate and manipulate by using 13 contexts of the neighboring voxels according to the raster scan order. Accordingly, it is necessary to efficiently reduce the number of the contexts. Three voxels having little effect on the total entropy can be removed. The three removed voxels are marked by 'X' in FIG. 13. Using this context, a voxel is encoded by the context-based AAC.

After encoding the depth information, the R, G, B color values of the 'B' voxels within the current node area are DPCM-encoded and AAC-encoded in the raster scan order. The R, G, and B values of a 'B' voxel to be encoded are predicted from those of the previous 'B' voxel, respectively, and the prediction residuals are encoded with the AAC.

While the encoding operation of 3D object data has been described mainly regarding a progressive encoding scheme in the encoding scheme of 3D data, according to embodiments of the present invention, a lossless or a lossy encoding scheme may be employed. All 3D object data to be encoded are encoded in the lossless encoding scheme, while only some nodes beginning from a root node are encoded into bitstreams in the lossy encoding scheme.

Figure 5A:
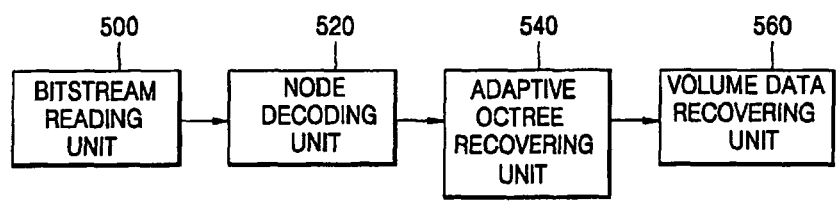
FIG. 5A is a block diagram of an apparatus for decoding 3D object data, according to an embodiment of the present invention.

As shown in FIG. 5A, the node decoding unit 520 decodes an 'S' or a 'P' node from the read nodes. As further shown in FIG. 6, the node decoding unit 520 may include a node order selecting unit 600, a node SOP selecting unit 620, an 'S' node decoding unit 640, and a 'P' node decoding unit 660. The node order selecting unit 600 informs which node should be decoded when nodes are sequentially recovered in an adaptive octree. The node SOP selecting unit 620 determines whether the node selected in the node order selecting unit 600 is 'S'-decoded or 'P'-decoded. The 'S' node decoding unit 640 performs a split-decoding operation, and the 'P' node decoding unit 660 performs a PPM-decoding operation.

The adaptive octree recovering unit 540 recovers the adaptive octree from the recovered nodes, and in turn converts the recovered adaptive octree into an octree. While the adaptive octree has five kinds of labels, the octree does not have these labels but has only black or white value.

The volume data recovering unit 560 recovers the original 3D object data from the input octree data, where the original 3D object data is any one of PointTexture, voxel, and octree data.

A method, medium, and apparatus for decoding 3D object data according to embodiments of the present invention will now be set forth. As noted above, FIG. 5A is a block diagram showing an apparatus for decoding 3D object data according to an embodiment of the present invention. The apparatus may include a bitstream reading unit 500, a node decoding unit 520, an adaptive octree recovering unit 540, and a volume data recovering unit 560. FIG. 5B is a flowchart showing a method of decoding 3D object data, according to an embodiment of the present invention.

The bitstream reading unit 500 reads nodes of a tree from bitstreams of the encoded 3D data (operation 50), where an 'S' node is read as a split node, and a 'P' node is read as a PPM node. As shown in illustration (a) of FIG. 14, the header information is decoded into width, height, and depth, which are the resolution information of volume containing a 3D object, to read a bitstream. Next, nodes are sequentially decoded one by one starting from a root node to read bitstreams. The nodes with the total number of 'N' to be decoded can be represented by Node-1, Node-2, . . . , Node-N. The bitstream of each of the nodes is read as SOP ('S' or 'P') and DIB, as shown in FIG. 14B.

If the SOP indicates that the current node is an 'S' node, as shown in illustration (c) of FIG. 14, DIB is decoded into the average color of the current node area and up to eight flags indicating whether the child nodes are 'W.' In the case of a node without voxel areas, the number of flags can be reduced. The 'E' node is a virtual node, which can be located by using the resolution information of the entire bounding volume.

If SOP represents that the current node is a 'P' node, as shown in illustration (d) of FIG. 14, the depth information of the voxels within the current node area is PPM-decoded, and the color information of the 'B' voxels is sequentially inversely AAC-decoded and inversely DPCM-decoded. The binary voxel values to be decoded within a 'P' node are PPM-decoded using the neighboring 10 decoded voxel values as contexts.

After decoding the depth information, the R, G, B color values of the 'B' voxels within the current node area are inversely AAC-decoded and inversely DPCM-decoded in the raster scan order. The R, G, and B values of a 'B' voxel to be decoded are inversely predicted from those of the previous 'B' voxel, respectively, and the prediction residuals are decoded with the inverse AAC.

Meanwhile, again, the node decoding unit 520 decodes an 'S' or a 'P' node from the read nodes (operation 52).

As noted above, the node order selecting unit 600 informs which node should be decoded when nodes are sequentially recovered in an adaptive octree. More specifically, the node order selecting unit 600 selects nodes to be decoded one by one starting from a root node while recovering an adaptive tree structure of a 3D object in a top-down manner, and outputs location information values of the nodes. The order of nodes to be decoded is determined in a breadth-first search scheme using a queue. After inserted into the queue, the root node is removed from the queue while labels of child nodes of the root node are decoded. In illustration (b) of FIG. 10, the root node to be decoded is indicated by a square which is 'S', where the actual values of the node to be decoded are child nodes of the root node depicted by a rectangle, which are 'B', 'B', 'W', and 'B'.

Again, the node SOP selecting unit 620 determines whether the node selected in the node order selecting unit 600 is an 'S' or a 'P' node, and thus determines which node to be decoded should be decoded into an 'S' node or a 'P' node. This value is selected from the value decoded in the bitstream reading unit 500.

Figure 15:
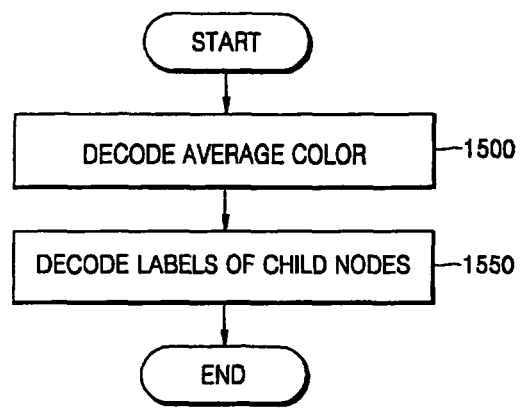
FIG. 15 is a flowchart showing a procedure of decoding an 'S' node.

The 'S' node decoding unit 640 decodes the detailed information of an 'S' node if the node type information is 'S', and the 'S' node is decoded according to the procedure shown in FIG. 15. The average R (red), G (green), and B (blue) values of the voxels in the 'S' node is initially decoded using the inverse AAC (operation 1500). The labels of the child nodes are decoded into the 'B' or 'W' value by way of the inverse AAC (operation 1550). When the root node is decoded into the 'S' node in illustration (b) of FIG. 10, the labels of child nodes of the root node are 'B', 'B', 'W', and 'B', which are the actual decoded values. Since 'B' is probably a temporary label among the labels of the child nodes, 'B' may be changed to 'S' or 'P' later.

Figure 16:
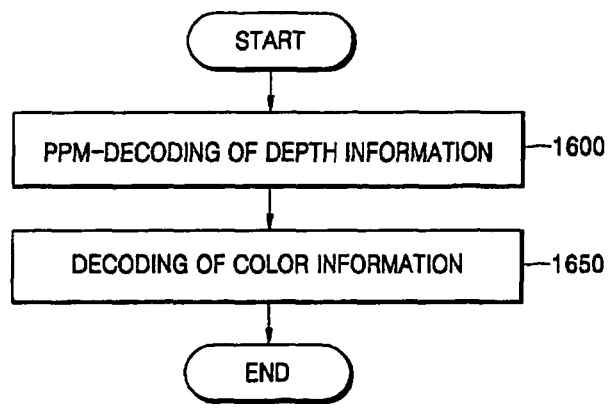
FIG. 16 is a flowchart showing a procedure of decoding an 'P' node.

The 'P' node decoding unit 660 decodes the detailed information of a 'P' node if the node type information is 'P', and the 'P' node is decoded according to the procedure shown in FIG. 16. The depth information of the voxels within the node area is PPM-decoded (operation 1600), and the color information of the voxels is inversely AAC-decoded and inversely DPCM-decoded (operation 1650). FIG. 13 shows contexts used for PPM-decoding voxels. A two-dimensional plane with a depth of 'k' on the right side is a section where there are voxels previously decoded and to be currently decoded, and a two-dimensional plane with a depth of 'k−1' on the left side is a neighboring section where there are voxels previously decoded. Only 10 circular voxels, except voxels marked by 'X', are used to make a context and are PPM-decoded. Accordingly, in this case, the context becomes '0111000011'. The order of the context is enumerated according to the raster scan order. The color information is decoded into the R, G, and B values, which are the colors of 'B' voxels within the current node, by way of the inverse AAC and the inverse DPCM.

The adaptive octree recovering unit 540 recovers the adaptive octree from the decoded nodes (operation 54). While the adaptive octree has five kinds of labels, the octree does not have these labels but has only black or white values. The adaptive octree is the same as described above in the encoding method, medium, and apparatus, so the detailed description is omitted.

The volume data recovering unit 560 recovers the original 3D object data from the adaptive octree data, where the original 3D object data is any one of PointTexture, voxel, and octree data (operation 56). The octree can be converted into the voxel and the PointTexture.

While the decoding of 3D object data has been described mainly regarding a progressive decoding scheme, a lossless or a lossy encoding scheme may also be employed. All bitstreams are decoded in the lossless decoding scheme, while only a part of the bitstreams from the beginning are encoded in the lossy decoding scheme.

Embodiments of the present invention can be implemented by computer-readable code included in a medium, e.g., a computer-readable recording medium. Examples of media include all kinds of recording devices in which data to be read/written by/to a computer system is stored/transferred. Examples of the media further include ROM, RAM, CD-ROM, magnetic tape, floppy disk, and optical storage device, for example. In addition, the media can be distributed in a computer system connected through a network, and the computer readable code can be recorded/transferred and implemented in a distributed manner.

According to a method, medium, and apparatus for encoding and decoding 3D data of the present invention, it is possible to efficiently encode a huge amount of 3D data, and to recover the high-definition 3D data with a small amount of data since it is possible to efficiently encode the 3D data with a certain resolution as well as a fixed resolution. In addition, it is possible to progressively exhibit the 3D data during decoding since a progressive bitstream is generated.

Figure 17:
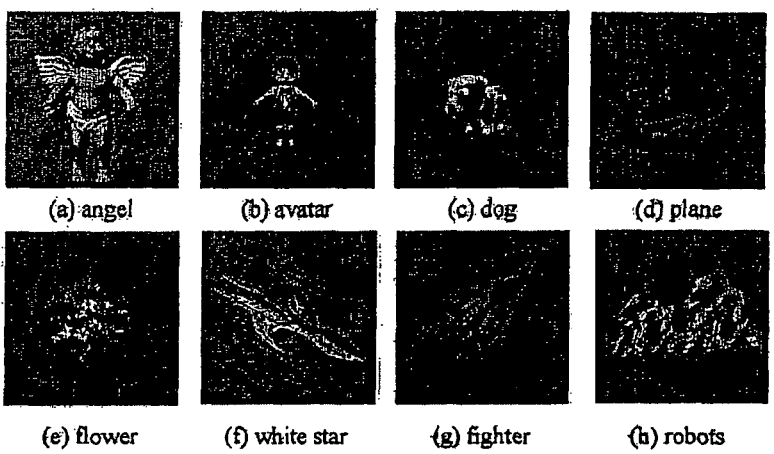
FIG. 17 shows test models for evaluating the performance of embodiment of the present invention.

The performance of a method embodiment of encoding and decoding 3D object data has been evaluated using test models shown in FIG. 17. The models in illustrations (a)-(e) of FIG. 17 have the resolution of 256×256×256, and the models in illustrations (f)-(h) of FIG. 17 have the resolution of 512×512×512.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of encoding 3D data, comprising:
converting 3D data having any one of at least PointTexture, voxel, and octree data into adaptive octree data, using at least one processing device, where nodes have labels, including at least a label representing an empty node that is not encoded and is recognized by resolution information of a bounding volume of a 3D object;
encoding nodes of the adaptive octree data; and
generating and outputting a bitstream from the encoded nodes,
wherein the converting of the 3D data into adaptive octree data comprises:
converting the 3D data into voxel data using a 3D bounding volume; and
differentiating a voxel with respect to a location where a 3D object exists and a voxel with respect to a location where the 3D object does not exist by predetermined labels, the predetermined labels indicating a case 'S' where a node of an adaptive tree structure indicating the 3D data has sub-nodes, a case 'W' where the node has voxels not having objects, a case 'B' where the node has voxels having objects, a case 'P' where voxel values within the node are encoded by a PPM (prediction by partial matching) algorithm, and a case 'E' for the empty node where a space for voxels of the node does not exist, and
wherein the encoding of the nodes comprises:
selecting an order of the nodes of the adaptive octree data to be encoded;
selecting node type information indicating whether the nodes to be encoded should be encoded into an 'S' node or a 'P' node; and
encoding detailed information of the 'S' node if the node type information is 'S', and encoding the detailed information of the 'P' node if the node type information is 'P'.

2. The method according to claim 1, wherein the selecting of the order comprises selecting the nodes to be encoded one by one in a breadth-first search scheme and a top-down manner starting from a root node by referring to the labels in the adaptive tree structure for the 3D object.

3. The method according to claim 1, wherein the selecting of the node type information comprises:

calculating entropy for each of the 'S' node and 'P' node encoding operations, and selecting the encoding operation with smaller entropy; and
performing an AAC (adaptive arithmetic coder)-encoding operation of the label of the selected 'S' or 'P' node.

4. The method according to claim 1, wherein the encoding of the 'S' node encodes an average value of the color information and the labels of the sub-nodes,
wherein the encoding of the color information comprises performing an AAC-encoding operation of an average color of voxels within a current node area into R (red), G (green), and B (blue) values, and
wherein the encoding of the labels of the sub-nodes comprises performing an AAC-encoding operation of the labels of the sub-nodes of a current node into 'B' or 'W' value.

5. The method according to claim 1, wherein the encoding of the 'P' node comprises encoding depth information and the color information,
wherein the encoding of the depth information comprises performing a PPM- or an AAC-encoding operation of all sub-nodes of a current node in a raster scan order using a predetermined number of contexts, and
wherein the encoding of the color information comprises performing DPCM (differential pulse code modulation)- and AAC-encoding operations of R, G, and B values of 'B' voxels within a current node area.

6. The method according to claim 1, wherein the generating of a bitstream comprises generating a progressive bitstream comprising resolution information of a bounding volume of a 3D object and supporting both a lossy encoding scheme encoding only a part of nodes from a beginning until a predetermined node and a lossless encoding scheme encoding all nodes from the beginning to an end.

7. At least one processor to encode 3D data, comprising:
an adaptive octree generating unit converting 3D data having one of at least PointTexture, voxel, and octree data into adaptive octree data where nodes have labels, including at least a label representing an empty node that is not encoded and is recognized by resolution information of a bounding volume of a 3D object;
a node encoding unit encoding nodes of the adaptive octree data; and
a bitstream generating unit generating a bitstream from the nodes encoded in the node encoding unit,
wherein the adaptive octree data in the adaptive octree generating unit is represented by converting the 3D data into voxel data using a 3D bounding volume and differentiating a voxel on a location where a 3D object exists and a voxel on a location where the 3D object does not exist by predetermined labels, the predetermined labels indicating a case 'S' where a node of an adaptive tree structure indicating the 3D data has of sub-nodes, a case 'W' where the node has voxels not having objects, a case 'B' where the node has voxels having objects, a case 'P' where voxel values within the node are encoded by a PPM algorithm, and a case 'E' for the empty node where space for voxels of the node does not exist, and
wherein the node encoding unit comprises:
a node order selecting unit selecting an order of nodes of the adaptive octree data to be encoded;
a node SOP selecting unit selecting node type information indicating whether the nodes to be encoded should be encoded into 'S' or 'P' nodes;
an 'S' node encoding unit encoding detailed information of the 'S' node if the node type information is 'S'; and a 'P' node encoding unit encoding the detailed information of the 'P' node if the node type information is 'P'.

8. The at least one processor according to claim 7, wherein the node order selecting unit selects nodes to be encoded one by one in a breadth-first search scheme and a top-down manner starting from a root node by referring to the labels in the adaptive tree structure for the 3D object.

9. The at least one processor according to claim 7, wherein the node SOP selecting unit calculates entropy for each of the 'S' node and 'P' node encoding operations and selects the encoding operation with small entropy, and performs an AAC-encoding operation of the label of the selected 'S' or 'P' node.

10. The at least one processor according to claim 7, wherein the 'S' node encoding unit encodes an average value of color information and the labels of the sub-nodes, and
wherein the 'P' node encoding unit encodes depth information and color information.

11. The at least one processor according to claim 7, wherein the bitstream generating unit generates a progressive bitstream comprising resolution information of a bounding volume of a 3D object, supporting both a lossy encoding scheme encoding only a part of nodes from a beginning until a predetermined node and a lossless encoding scheme encoding all nodes.

12. A method of decoding 3D data, comprising:
receiving a bitstream for the 3D data including header information and node information, wherein the header information includes resolution information of a bounding volume of a 3D object and the node information includes information of nodes making up an adaptive tree structure except for an empty node having no voxel space;
reading nodes making up the adaptive tree structure from the bitstream;
decoding the read nodes, wherein no information for the empty node having no voxel space is decoded and the empty node having no voxel space is recognized by only the resolution information of the header information;
recovering an adaptive octree from the decoded nodes, using at least one processing device, wherein in the adaptive octree nodes have labels, including at least a label representing the empty node; and
recovering and outputting any one of at least octree, voxel, and PointTexture data from the adaptive octree,
wherein the reading of nodes comprises:
selecting nodes to be decoded one by one in a breadth-first search scheme starting from a root node while recovering the adaptive tree structure for a 3D object in a top-down manner,
reading and finding out node type information indicating whether a node to be decoded is an 'S' node or a 'P' node;
if the node type information is 'S', decoding an average value of color information and decoding labels of sub-nodes; and
if the node type information is 'P', decoding depth information and decoding color information, and
wherein in the recovering of the adaptive octree, the labels comprise 'S', 'W', 'B', 'P' and 'E', the 'S' denoting that a node of a tree indicating the 3D data to be decoded has sub-nodes, the 'W' denoting that the node has voxels not having objects, the 'B' denoting that the node has voxels having objects, the 'P' denoting that voxel values within the node are encoded by the PPM algorithm, and the 'E' for the empty node denoting that space for voxels of the node does not exist.

13. The method according to claim 12, wherein the reading of nodes further comprises reading resolution information of a bounding volume of a 3D object; and
wherein the decoding of the nodes comprises a lossy decoding operation, decoding only a part of nodes from a beginning until a predetermined node by using the resolution information.

14. The method according to claim 12, wherein the reading of nodes further comprises reading resolution information of a bounding volume of a 3D object; and
wherein the decoding of the nodes comprises a lossless decoding operation, decoding all nodes from a beginning to an end of nodes by using the resolution information.

15. The method according to claim 12, wherein, in the decoding of the average value of the color information, average R, G, and B values of voxels in a current node are decoded using an inverse AAC, and
wherein, in the decoding of the labels of sub-nodes, the labels of sub-nodes are decoded into 'B' or 'W' values by way of the inverse AAC.

16. The method according to claim 12, wherein the decoding of the depth information comprises performing an inverse PPM- or an inverse AAC-decoding operation of all sub-nodes of a current node in raster scan order using a predetermined number of contexts, and
wherein the decoding of the color information comprises performing inverse AAC- and inverse DPCM-decoding operations of R, G, and B values of 'B' voxels within a current node area.

17. At least one processor for decoding 3D data, comprising:
a bitstream reading unit receiving a bitstream for the 3D data including header information and node information, wherein the header information includes resolution information of a bounding volume of a 3D object and the node information includes information of nodes making up an adaptive tree structure except for an empty node having no voxel space and reading nodes making up the adaptive tree structure from the bitstream;
a node decoding unit decoding the read nodes, wherein no information for the empty node having no voxel space is decoded and the empty node having no voxel space is recognized by only the resolution information of the header information;
an adaptive octree recovering unit recovering an adaptive octree from the decoded, wherein in the adaptive octree nodes have labels, including at least a label representing the empty node; and
a volume data recovering unit recovering any one of at least octree, voxel, and PointTexture data from the adaptive octree,
wherein the node decoding unit comprises:
a node order selecting unit selecting nodes to be decoded one by one in a breadth-first search scheme starting from a root node while recovering the adaptive tree structure for a 3D object in a top-down manner;
a node SOP selecting unit determining node type information indicating whether the nodes to be decoded should be decoded into an 'S' node or a 'P' node;
an 'S' node decoding unit decoding an average value of color information and decoding labels of sub-nodes if the node type information is 'S'; and
a 'P' node decoding unit decoding depth information and decoding color information if the node type information is 'P', and wherein in the adaptive octree recovering unit, the labels comprise 'S', 'W', 'B', 'P' and 'E', the 'S' denoting that a node of a tree indicating the 3D data to be decoded has sub-nodes, the 'W' denoting that the node has voxels not having objects, the 'B' denoting that the node has voxels having objects, the 'P' denoting that voxel values within the node are encoded by the PPM algorithm, and the 'E' for the empty node denoting that space for voxels of the node does not exist.

18. The at least one processor according to claim 17, wherein the bitstream reading unit reads resolution information of a bounding volume of a 3D object and nodes; and wherein the node decoding unit decodes only a part of nodes from a beginning until a predetermined node or decodes all nodes from the beginning to an end of the nodes.

19. The at least one processor according to claim 17, wherein the decoding of the depth information comprises performing an inverse PPM- or an inverse AAC-decoding operation of all sub-nodes of a current node in raster scan order using a predetermined number of contexts, and wherein the decoding of the color information comprises performing inverse AAC- and inverse DPCM-decoding operations of R, G, and B values of 'B' voxels within a current node area.

20. A non-transitory computer-readable medium comprising computer readable code to implement the method according to claim 1.

21. A non-transitory computer-readable medium comprising computer readable code to implement the method according to claim 12.

* * * * *

UNITED STATES PATENT AND TRADEMARK OFFICE
CERTIFICATE OF CORRECTION

| | | |
|---|---|---|
| PATENT NO. | : 8,558,834 B2 | Page 1 of 1 |
| APPLICATION NO. | : 11/059462 | |
| DATED | : October 15, 2013 | |
| INVENTOR(S) | : Shinjun Lee | |

It is certified that error appears in the above-identified patent and that said Letters Patent is hereby corrected as shown below:

On the Title Page, Item (54) and in the Specification, Column 1, Line 1, (Title), Delete "MEDIUM" and insert -- MEDIUM, --, therefor.

On the Title Page, In Column 2 (Other Publication), Line 2, Delete "OctreeImage" and insert -- OctreeImage --, therefor.

Signed and Sealed this
Eighteenth Day of February, 2014

Michelle K. Lee
*Deputy Director of the United States Patent and Trademark Office*